United States Patent [19]

Hughes

[11] Patent Number: 4,879,319

[45] Date of Patent: Nov. 7, 1989

[54] ANHYDROUS REFRACTORY PLASTIC

[75] Inventor: Gustav O. Hughes, Pittsburgh, Pa.

[73] Assignee: Dresser Industries, Inc., Dallas, Tex.

[21] Appl. No.: 18,356

[22] Filed: Feb. 24, 1987

[51] Int. Cl.$^4$ .............................................. C08K 3/34
[52] U.S. Cl. .................................. 523/139; 523/140; 523/141
[58] Field of Search ...................... 523/139, 140, 141; 524/386

[56] References Cited

U.S. PATENT DOCUMENTS

| 3,904,566 | 9/1975 | Cudby | 523/139 |
| 4,072,531 | 2/1978 | Funabiki et al. | 523/140 |
| 4,082,718 | 4/1978 | Ando et al. | 523/140 |
| 4,585,809 | 4/1986 | Auer et al. | 523/139 |
| 4,639,474 | 1/1987 | Vezza | 523/141 |

OTHER PUBLICATIONS

Chemical Engineering; "Characteristics of Fine Particles"; Jun. 11, 1962.

Primary Examiner—Lewis T. Jacobs
Attorney, Agent, or Firm—Sigalos, Levine & Montgomery

[57] ABSTRACT

An refractory plastic comprising a refractory aggregate and a bonding and plasticizing agent consisting essentially of a powdered novolak resin and a solvent; said agent being present in an amount sufficient to plasticize said refractory.

6 Claims, No Drawings

ANHYDROUS REFRACTORY PLASTIC

BACKGROUND OF THE INVENTION

The present invention relates to refractory plastics. These are moldable materials that can be taken from containers and rammed into cracks and forms which set upon heating. Presently such plastics are used in numerous furnaces ranging from steel making vessels to those used for carbon baking, aluminum, cement and the like. Conventionally such plastics use a combination of clay or bentonite and water as a plasticizing agent with phosphoric acid, a dextrin or molasses based material to obtain a set of the refractory. Some plastics also contain a water soluble resin as a setting agent.

A major problem with such plastics is that associated with the presence of water. Water prevents the satisfactory use of the hydratable refractory aggregates such as magnesite and reduces the effectiveness of carbon containing plastics due to oxidation. Another problem with such plastics is that the typical plasticizers such as ball clay or bentonite tend to flux the system at high temperatures.

In addition to refractory plastics, ramming mixes are used to be rammed into cracks or forms in such places. Typically these mixes are free flowing granular materials with enough tack to knit together when compacted into place into the cracks. The typical bonding phases are similar to refractory plastics, although several others including nonaqueous systems are also used. One bonding system for example is a liquid novolak or resol resin. These are commonly used for magnesite ramming mixes and alumina-carbon ramming mixes as those used for blast furnace troughs. As has been noted above, water is not suitable when using a hydratable refractory aggregate such as magnesite. Though bonding phases are similar, ramming mixes tend to differ from plastics mostly in moisture content. Increasing the moisture content of a typical ramming mix will usually result in a plastic body with reasonable properties. Increasing however the liquid resin content of a resin bonded ramming mix does not result in plastic massive body that has reasonable refractory properties. Thus, no nonaqueous resin bonded plastics are commercially available with the exception of few mixes with ball clay or other plasticizers. It has not been possible heretofore to have anhydrous monolithic refractory plastics which can use any type of refractory aggregate, including those that are generally hydratable, which are cohesive and which can be bonded at bond contents low enough to not adversely affect desired physical properties of the refractory material.

SUMMARY OF THE INVENTION

The present invention overcomes the problems of the art and provides anhydrous monolithic refractory plastics which have good plasticity, excellent physical properties and high refractoriness.

Briefly stated, the present invention comprises an anhydrous refractory plastic comprising a refractory aggregate and a bonding and plasticizing agent consisting essentially of a powdered novolak resin and a solvent therefor; said powdered novolak resin and solvent being present in amounts efficient to plasticize said refractory.

DETAILED DESCRIPTION OF THE INVENTION

The essential elements of the instant refractory plastic are the refractory aggregate and the bonding and plasticizing agent.

As to the refractory aggregate, it can be any of a wide variety of refractory materials or refractory grogs used in plastics or ramming mixes such as alumina grog fireclay, silica, silicon carbide, corundum, mullite calcines, calcined fireclay grain, fused alumina-chrome, graphite, magnesite, dolomite, picrochromite, silica, or any combination thereof. Other refractory grains can also be utilized, the ones noted simply being illustrative of the wide range of materials that can be utilized. Preferred is magnesite; particularly a combination of magnesite and graphite; particularly in weight ratio of about 4:1 to 9:1, since such combination gives the best resistance to slags found in steelmaking processes.

For each one hundred parts by weight of the refractory there is added the plasticizing and bonding agent which consists essentially of a powdered novolak resin and a solvent. The bonding and plasticizing additive is added in an amount sufficient to plasticize the refractory. This amount will vary dependent upon the particular refractory used, as well as the particular solvent and novolak resin. But generally, for each one hundred parts by weight of the monolithic refractory plastic, there are added from three to ten parts by weight of the powdered novolak resin and about four to fifteen parts by weight of the solvent.

The powdered novolak resin can be any phenolic resin with a phenol:formaldehyde molar ratio greater than one and, thus, is phenol terminated. These are commercially and commonly available resins. It is important that the resin be finely powdered, for reasons to be discussed further below, and generally a particle size of about −60 mesh or finer is suitable. The desired results cannot be obtained with a liquid or flake novolak resin.

An important feature of the present invention is that there is no need to add a curing agent for the resin although such can be added if desired. More specifically, a novolak resin cannot react with itself and thus needs a linking agent to cure. Conventionally used for this purpose with novolak resins are certain amines and most specifically hexamethylenetetramine (hexa). The rate of curing is controlled to a certain extent by the amount of hexa added. With the present invention however, no hexa is needed since the novolak resin per se can create a refractory bond. The resin decomposes at the temperatures used in the furnaces under reducing conditions to leave a carbon ash between the refractory aggregates which is sufficient to bond the aggregate. If hexa is used it is generally added, again dependent upon the particulars of any given composition, in an amount of from about 2 to 15 parts by weight for each 100 parts by weight of powdered novolak resin.

As to the solvent, it can be any known to be suitable for use a solvent for novolak resins. Examples are the glycols, alcohols, benzene, and the like. It is preferred to use glycol solvents such as ethylene glycol, diethylene glycol, triethylene glycol, tetraethylene glycol or mixtures thereof. The alcohols and benzene are not desirable since these often give off objectionable odors and are considered unsatisfactory in the work place and are much more flammable.

While the precise reason for the unexpected results of the present invention is not entirely understood, it is known that a powdered novolak resin must be used and that a solution of a novolak resin such as one prepared by pre-dissolving the novolak in a solvent such as ethylene glycol or a flaked novolak resin cannot be effectively used to obtain the proper plasticity or cohesiveness. It is believed that this is due to a fact noted when a solvent is added to a mix of the refractory aggregate and the powdered novolak resin. More specifically, the resin begins to dissolve and since the refractory aggregates used are porous materials and the refractory aggregates finds have a high surface area, there is competition for the fluid, namely the solvent, and the resin does not completely dissolve. This leaves very slippery, tacky, partially dissolved resin particles that act to impart high plasticity and cohesiveness to the mix. This is found to be true even without the presence of the conventional clay that have been heretofore used as plasticizers in such refractory plastics.

While not necessary, it is possible, if desired, to add minor amounts of conventional plasticizers such as ball clay of bentonite to the refractory aggregate. Silicon can also be utilized in its usual amounts in carbon containing materials to reduce oxidation. Finally, materials that add strength due to sintering in oxidizing atmosphere; such as boric acid, can be use in their usual amounts.

An interesting aspect of the present invention is the ability to use a carbon-containing material as part of the refractory aggregate. Such carbon containing materials, particularly graphite, have extremely high resistance to steel slags. They have not often been utilized in water-containing plastic mixes previously since water vapor when combined with the high temperatures in such furnaces, acts as an oxidation aid and limits the effectiveness of the carbon in such mixes. With the compositions of the present invention being anhydrous, it permits incorporation of the carbon containing material, such as graphite, silicon carbide, and the like, in the plastic to take full advantages of its properties of high resistance. Thus, such materials when used in compositions applied to steelmaking furnaces give the monolithic refractory plastic a high resistance to steel slags.

Further, another major advantage of the present invention is that it enables the use of refractory aggregates unstable in aqueous bonding systems. Magnesite and dolomitic materials such as magnifrit are very compatible to a variety of iron and steel furnace applications, but are incompatible with water. They tend to hydrate in the presence of water, which sharply adversely effects the refractory plastic in use and for these reasons magnesite and dolomitic materials are not used with systems containing water.

Thus, the refractory plastic compositions of the present invention comprise the following:

|  | % by wt |
|---|---|
| Refractory aggregates | 65–100 |
| Carbon-containing material (If not part of refractory aggregate) | 0–30 |
| Ball Clay or Bentonite | 0–5 |
| Silicon | 0–5 |
| Plus Additions | |
| Powdered Novolak Resin | 3–10 |
| Solvent | 4–15 |

In forming the refractory plastics of the present invention the resin is first admixed with the refractory aggregate to form a substantially homogeneous mix and then the solvent added with mixing until the desired degree of plasticizing is obtained. Conventional low intensity mixers used presently with refractories can be used for this purpose.

The instant invention will be further described in connection with the following examples which are set forth for purposes of illustration only. In these examples the proportions are in percent by weight, unless expressly stated to the contrary.

EXAMPLES 1 TO 7

A series of seven refractory plastic compositions were prepared and tested using three different purity magnesites. The preparation involved admixing the resin with the refractory aggregate and then adding the solvent with mixing until a substantially homogeneous composition was obtained All the mixing was carried out in a conventional low intensity mixer. The specifics of each composition and the test results are set forth in Table I below.

TABLE I

| Composition | Example No. | | | | | | |
|---|---|---|---|---|---|---|---|
|  | 1 | 2 | 3 | 4 | 5 | 6 | 7 |
| 98 Grade Magnesite | | | | | | | |
| −4 + 10 mesh | 25 | 25 | 15 | — | 15 | 15 | — |
| −10 + 28 mesh | 20 | 20 | 10 | — | 10 | 10 | — |
| −28 mesh | 25 | 14 | 20 | — | 20 | 30 | — |
| BM 70 | 17.5 | 16 | 35 | — | 35 | 35 | — |
| 96A Magnesite | | | | | | | |
| −4 + 10 mesh | — | — | — | 15 | — | — | — |
| −10 + 28 mesh | — | — | — | 10 | — | — | — |
| −28 mesh | — | — | — | 20 | — | — | — |
| BM 55 | — | — | — | 35 | — | — | — |
| M-10 Magnesite | | | | | | | |
| −4 + 10 mesh | — | — | — | — | — | — | 20 |
| −10 + 28 mesh | — | — | — | — | — | — | 15 |
| −28 mesh | — | — | — | — | — | — | 20 |
| BMF | — | — | — | — | — | — | 35 |
| Graphite (Mexaloy) | 7.5 | 20 | 20 | 20 | 20 | 10 | 10 |
| Bentonite | 5 | 5 | — | — | — | — | — |
| Plus Additions: | | | | | | | |
| Powdered Novolak (RD 2414 Resin) | 6 | 8 | 8 | 8 | 8 | 8 | 6 |
| Boric Acid | — | — | — | — | — | 1 | 1 |

TABLE I-continued

| Composition | Example No. | | | | | | |
|---|---|---|---|---|---|---|---|
| | 1 | 2 | 3 | 4 | 5 | 6 | 7 |
| Ethylene Glycol | | | | | | | |
| To Press: | 7.5 | 7.0 | 7.0 | 7.0 | 8.0 | 7.5 | 7.5 |
| To Store: | 8.5 | 8.5 | 9.0 | 8.5 | — | — | — |
| Workability Index(14# wt) | | | | | | | |
| To Press: | 23 | 15 | 19 | 15 | 30 | 27 | 32 |
| To Store: | 42 | 38 | 60+ | 43 | — | — | — |
| Sand Rammed Density, pcf: | 161 | 148 | 153 | 147 | — | — | — |
| Bulk Density, pcf: | | | | | | | |
| After Drying at 300° F.: | 161 | 148 | 152 | 147 | 154 | 161 | 160 |
| After a 2000° F. Reheat: | 148 | 137 | 138 | 137 | | | |
| Modulus of Rupture, psi | | | | | | | |
| After Drying at 300° F.: | 1290 | 2120 | 4060 | 2860 | 3200 | 3650 | 1940 |
| After a 2000° F. Reheat: | 110 | 320 | 220 | 220 | | | |
| At 2000° F.: | 440 | 660 | 670 | 710 | | | |
| Crushing Strength, psi | | | | | | | |
| At 2800° F.: | 610 | 860 | 1090 | 860 | | | |
| Reheat Change after 2000° F. reducing | | | | | | | |
| % Linear: | 0.1 | −0.5 | −0.1 | −0.1 | | | |
| % Volume: | −0.6 | −1.2 | −0.7 | −2.0 | | | |

Of the foregoing compositions, the one of Example 3 is preferred because it had excellent cohesiveness and plasticity as well as storage stability.

EXAMPLES 8 to 14

A series of seven refractory plastic compositions were prepared as in Examples 1 to 7 and tested. The specifics of each composition and the test results are set forth in Table II below.

TABLE II

| Composition: | Example No. | | | | | | |
|---|---|---|---|---|---|---|---|
| | 8 | 9 | 10 | 11 | 12 | 13 | 14 |
| Magnifrit | | | | | | | |
| −4 + 10 mesh | 25 | — | — | — | — | — | — |
| −10 + 28 mesh | 15 | — | — | — | — | — | — |
| −28 mesh | 15 | — | — | — | — | — | — |
| BMF | 27 | — | — | — | — | — | — |
| 98 Grade | | | | | | | |
| −4 + 10 mesh | | 40 | 25 | 35 | 40 | 25 | 10 |
| −10 + 28 mesh | | 20 | 20 | 10 | 17 | 20 | 10 |
| −28 mesh | | 5 | 20 | 7 | 8 | 25 | 20 |
| BMF | | 25 | 32 | 25 | 12 | 27 | 40 |
| Graphite (Mexaloy) | 10 | 10 | — | 20 | 20 | — | 20 |
| Carbon Black | 5 | — | — | — | — | — | — |
| Bentonite | 3 | — | 3 | 3 | 3 | 3 | — |
| Plus Additions | | | | | | | |
| Powdered Novolak Resins | | | | | | | |
| RD 2414 Resin | 5 | — | 6 | 6 | — | — | 4 |
| RD 2477 Resin | — | 8 | — | — | — | — | — |
| RD 2445 Resin | — | — | — | — | 6 | 6 | — |
| Ethylene Glycol | 7 | — | 6 | 8 | 6 | 5 | 15 |
| Triethylene Glycol | — | 10 | — | — | — | — | — |
| Workability Index, (14# wt): | 16 | ND | 16 | 38 | 24 | 32 | ND |
| Pressed Density, pcf | | | | | | | |
| After Drying at 300° F.: | 157 | — | 171 | — | — | 175 | — |

Comments:
Ex. 8: Had good plasticity, storage
Ex. 9: Made very soft to obtain flow, good storage
Ex. 10: Good plasticity and storage
Ex. 11: High intensity mixed, poor storage
Ex. 12: High intensity mixed, fair to poor storage
Ex. 13: Good Plasticity
Ex. 14: Made to mastic consistency, good storage It will be noted that the amount of solvent (ethylene glycol) needed to reach the most satisfactory plastic consistency in each case increased as the molecular weight of the resin increased.

A major advantage of the plastic mixes of the present invention is the chemical resistance given by the preferred refractories; namely those containing magnesite and carbon, which are very resistant to those slags found in many steel making processes. Another important feature is that magnesite carbon bricks are typically used in these furnaces and the plastics of the present invention which are of themselves magnesite and carbon are compatible with the brick thus making them very suitable for use in ramming into cracks or other portions of the refractory lining of such furnaces.

While the invention has been described in connection with a preferred embodiment, it is not intended to limit the scope of the invention to a particular form set forth, but, on the contrary, it is intended to cover such alternatives, modification, and equivalents as may be included within the spirit and scope of the invention as defined by the appended claims.

What is claimed is:

1. An anhydrous monolithic refractory plastic consisting essentially of 100 parts by weight of a refractory aggregate, and a bonding and plasticizing agent consisting of; for each 100 parts by weight of said aggregate, about 3 to 10 parts by weight of a powdered novolak resin having a particle size of −60 mesh or finer and about 4 to 15 parts by weight of a glycol solvent.

2. The refractory plastic of claim 1, wherein the refractory aggregate is a magnesite.

3. The refractory plastic of claim 1 or 2 wherein the refractory aggregate is a combination of magnesite and a graphite.

4. The refractory plastic of claim 1 or 2 wherein the refractory aggregate consists of a magnesite and a graphite in a weight ratio of about 4:1 to 9:1 and the solvent is a glycol solvent selected from ethylene glycol, diethylene glycol, triethylene glycol, tetraethylene glycol, or mixture thereof.

5. An anhydrous refractory plastic consisting of:

| | % by wt |
|---|---|
| Magnesite | 80–100 |
| Graphite | 10–20 |
| Bentonite | 0–5 |
| Silicon | 0–5 |
| Plus Additions: | |
| Powdered Novolak resin having a particle size | |

| | % by wt |
|---|---|
| Of −60 mesh or finer | 3–10 |
| A glycol solvent selected from Ethylene glycol, diethylene glycol, triethylene glycol, tetraethylene glycol or mixture thereof | 4–15. |

6. An anhydrous refractory plastic consisting of:

| | % by wt. |
|---|---|
| Magnesite | 80–100 |
| Graphite | 10–20 |
| Bentonite | 0–5 |
| Silicon | 0–5 |
| Plus Additions | |
| Powdered novolak resin having a particle size of −60 mesh or finer | 3–10 |
| A glycol solvent selected from ethylene glycol, diethylene glycol, triethylene glycol, tetraethylene glycol or mixtures thereof | 4–15 |
| A curing agnet for said resin in an amount of 2 to 15 parts by weight for each 100 parts by weight of powdered novolak resin. | |

* * * * *